US012725978B2

(12) United States Patent
Yu

(10) Patent No.: US 12,725,978 B2
(45) Date of Patent: Sep. 1, 2026

(54) ELECTRICAL CONNECTOR WITH SINGLE GROUNDING BARS FOR SUPPRESSING GROUNDING RESONANCE

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Xin Yu, Champaign, IL (US)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 314 days.

(21) Appl. No.: 18/378,827

(22) Filed: Oct. 11, 2023

(65) Prior Publication Data

US 2024/0136770 A1 Apr. 25, 2024
US 2024/0235122 A9 Jul. 11, 2024

Related U.S. Application Data

(60) Provisional application No. 63/380,383, filed on Oct. 20, 2022.

(51) Int. Cl.
*H01R 13/64* (2006.01)
*H01R 13/6471* (2011.01)

(52) U.S. Cl.
CPC ................................ *H01R 13/6471* (2013.01)

(58) Field of Classification Search
CPC ............ H01R 13/6471; H01R 13/6597; H01R 12/79; H01R 13/02; H01R 13/40; H01R 13/648
See application file for complete search history.

(56) References Cited

U.S. PATENT DOCUMENTS 4,975,069 A * 12/1990 Fedder ................. H01R 12/775 439/497
7,371,117 B2 5/2008 Gailus
7,972,151 B2 * 7/2011 He ..................... H01R 13/6471 439/108
8,215,994 B2 7/2012 Duenas
8,449,330 B1 * 5/2013 Schroll ................ H01R 13/514 439/607.06
8,545,240 B2 10/2013 Casher
8,764,460 B2 7/2014 Rutger et al.
8,764,464 B2 * 7/2014 Buck ...................... H01R 12/00 439/189
8,944,863 B1 * 2/2015 Yang .................. H01R 13/6585 439/733.1

(Continued)

*Primary Examiner* — Truc T Nguyen
(74) *Attorney, Agent, or Firm* — Ming Chieh Chang

(57) ABSTRACT

An electrical connector includes: an insulative housing loaded with a row of terminals arranged along a lateral direction; and the row of terminals at least comprising plural grounding terminals and a respective pair of differential signal terminals between every two adjacent grounding terminals, wherein selected two adjacent grounding terminals are bridged with a single grounding bar and constructed as a coupling grounding pair, while every adjacent coupling grounding pair are separated from each other.

8 Claims, 24 Drawing Sheets

(56) References Cited

U.S. PATENT DOCUMENTS

| | | | | |
|---|---|---|---|---|
| 9,017,103 | B2 * | 4/2015 | Davis | H01R 12/716 439/607.1 |
| 9,028,281 | B2 | 5/2015 | Kirk et al. | |
| 9,509,098 | B1 | 11/2016 | Henry et al. | |
| 9,666,991 | B2 * | 5/2017 | Davis | H01R 13/6585 |
| 9,692,183 | B2 * | 6/2017 | Phillips | H01R 13/6471 |
| 10,944,215 | B2 | 3/2021 | Chua et al. | |
| 11,011,873 | B2 | 5/2021 | Peloza et al. | |
| 11,817,655 | B2 * | 11/2023 | Liu | H01R 13/6471 |
| 2005/0136703 | A1 * | 6/2005 | Van Schuylenbergh | H05K 1/147 439/67 |
| 2012/0184145 | A1 * | 7/2012 | Zeng | H01R 13/6585 439/626 |
| 2013/0012038 | A1 * | 1/2013 | Kirk | H01R 12/724 439/55 |
| 2014/0057493 | A1 * | 2/2014 | De Geest | H01R 12/737 439/607.35 |
| 2014/0154927 | A1 * | 6/2014 | Nonen | H01R 13/65917 29/857 |
| 2014/0154928 | A1 * | 6/2014 | Nonen | H01R 4/04 29/857 |
| 2016/0126678 | A1 * | 5/2016 | Phillips | H01R 13/6585 439/607.09 |
| 2021/0075143 | A1 | 3/2021 | Laurx et al. | |
| 2021/0126404 | A1 | 4/2021 | Laurx et al. | |
| 2021/0328388 | A1 * | 10/2021 | Chen | H01R 13/2485 |
| 2021/0336360 | A1 | 10/2021 | Kolak et al. | |
| 2022/0352675 | A1 * | 11/2022 | Zerebilov | H01R 13/6581 |
| 2023/0029598 | A1 * | 2/2023 | Ito | H01R 12/7076 |
| 2024/0413554 | A1 * | 12/2024 | Qiu | H01R 13/6658 |

* cited by examiner

ELECTRICAL CONNECTOR WITH SINGLE GROUNDING BARS FOR SUPPRESSING GROUNDING RESONANCE

CROSS REFERENCE TO RELATED APPLICATIONS

This application claims priority to and the benefit of U.S. Provisional Patent Applications No. 63/380,383, filed on Oct. 20, 2022, the contents of which are incorporated entirely herein by reference.

BACKGROUND OF THE INVENTION

Field of the Invention

The present invention generally relates to electrical connectors suitable for high-speed communication, especially for transmitting differential pair signals.

Description of Related Arts

Many electrical connectors include signal terminals and ground terminal in which the signal terminals convey data signals and the ground terminals reduce crosstalk and/or electromagnetic interference (EMI) between the signal terminals. In differential signaling applications, the signal terminals are arranged in signal pairs for carrying the data signals.

To address grounding resonance issue with a higher and higher signal-transmitting application, previous patents apply grounding bar to push the resonance frequency to a higher frequency. A metallic grounding bar connects all grounding terminals among signal terminals together, thereby realizing a common grounding bar. U.S. Pat. No. 8,764,464 discloses a shieldless grounding coupling assembly, which shift unwanted spikes in insertion loss resonance frequencies to a higher frequency. Therefore, the shift resonance frequencies of existing connectors can extend to an operating higher frequency range without changing the mating or mounting interface dimensions of existing standardized or non-standardized connectors. U.S. Pat. Nos. 8,545,240 and 9,028,281 each disclose alternate grounding bar designs, i.e., single grounding bars, where bridging members not directly connected may provide improved performance even when high frequency signals are carried on a differential signal pair therebetween. For instance, U.S. Pat. No. 8,545,240 discloses a grounding bridge connecting with the grounding terminals, which can reduce an electrical length of the ground terminals and move a resonance frequency of the grounding terminals of the connector outside the range of the frequencies at which signal will transmit.

U.S. Pat. No. 7,371,117 discloses electrically lossy materials bridging ground terminals. The electrically lossy materials conduct, but with some loss, over the frequency range of interest. The use of electrically lossy material is to reduce unwanted resonances and improve connector performance. However, the electrically lossy materials substantially are capable of absorbing electrical resonance propagating through the housing but will also absorb some energy of the whole electric path which results in reduction of signal transmission.

Therefore, there is a need for improved electric performance of electrical connectors.

SUMMARY OF THE INVENTION

An electrical connector comprises: an insulative housing loaded with a row of terminals arranged along a lateral direction; and the row of terminals comprising a plurality of grounding terminals and a respective pair of differential signal terminals between every two adjacent grounding terminals along the lateral direction, the plurality of grounding terminals comprising a middle grounding terminal between two pairs of differential signal terminals and a first side grounding terminal and a second side grounding terminal at two opposite sides of a corresponding middle grounding terminal; wherein electromagnetic waves reflecting points between the middle grounding terminal and the first side grounding terminal are asymmetrical from electromagnetic waves reflecting points between the middle grounding terminal and the second side grounding terminal to destroy a resonance condition of the grounding terminals and suppress corresponding ground resonance.

An electrical connector comprises: an insulative housing loaded with a row of terminals arranged along a lateral direction; and the row of terminals at least comprising a plurality of grounding terminals and a respective pair of differential signal terminals between every two adjacent grounding terminals; wherein selected two adjacent grounding terminals are bridged with a single grounding bar and constructed as a coupling grounding pair, while every adjacent coupling grounding pairs are separated from each other.

An electrical connector comprises: an insulative housing loaded with a row of terminals arranged along a lateral direction; and the row of terminals comprising a plurality of grounding terminals and a respective pair of differential signal terminals between every two adjacent grounding terminals; wherein selected two adjacent grounding terminals are bridged with a first single grounding bar and constructed as a coupling grounding pair, while two adjacent grounding terminals of every two adjacent coupling grounding pairs are bridged with a second single grounding bar but without any coupled first grounding bars, and the first single grounding bar is located closer to front ends of the grounding terminals than the second single grounding bar is.

DETAILED DESCRIPTION OF THE DRAWINGS

Figure 1:
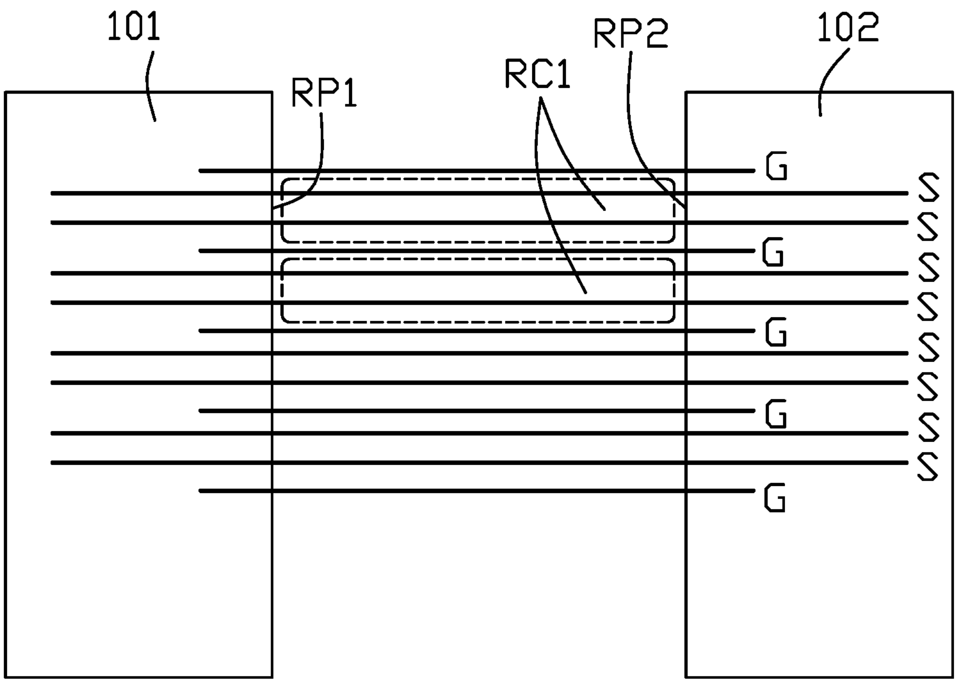
FIG. 1 is a sketch figure of EM wave reflecting points and resonance cavities among transmission path with no grounding bars.

Reference will now be made to the drawing figures to describe the preferred embodiment of the present invention in detail.

Along with a minimization of electrical connectors, a pitch between signal and ground terminals has been shrunk down to 0.6 mm. The undesirable electromagnetic wave coupling between signal and ground terminals is inevitable. The undesirable electromagnetic waves transmit along G-lines and can be reflected back with 180 degree along ground metal surfaces of the grounding terminals. Once an input and reflected waves are in constructive interference, the resonance occurs.

FIG. 1 illustrates a sketch figure of EM wave reflecting points and resonance cavities among connector path. The PCB 101 and the cable 102 are connected with each other by a board connector and a cable connector with signal path S and grounding path G. Two grounding path G are located at two sides of each differential signal pair path S, the grounding paths are separated from each other without any grounding bar bridging the grounding paths. The undesirable electromagnetic waves transmit long the grounding path G and reflect between a PCB ground plane at a reflect point RP1 and a cable ground shielding at a reflect point RP2. In actual products, the reflect points include reflect at some points and/or some surfaces, which is not limited. Therefore, two resonance cavity RC1 is formed at sides of the grounding path G, one resonance cavity RC1 is formed between the grounding path and the adjacent signal terminal S of one differential signal pair, another resonance cavity RC1 is formed between the grounding path and an adjacent signal terminal of another differential signal pair. Once an input electrical energy and reflected waves are in constructive interference along the balanced and symmetrical resonance cavities RC1, the grounding resonance occurs. The ground resonance is not only harmful to the local GSSG differential pair, like sharp valleys in insertion loss of S-parameters, but also can be received by the adjacent pairs, like sharp peaks in NEXT and FEXT of S-parameters. It is noted that only the resonance cavities at one grounding path G is illustrated.

Figure 2:
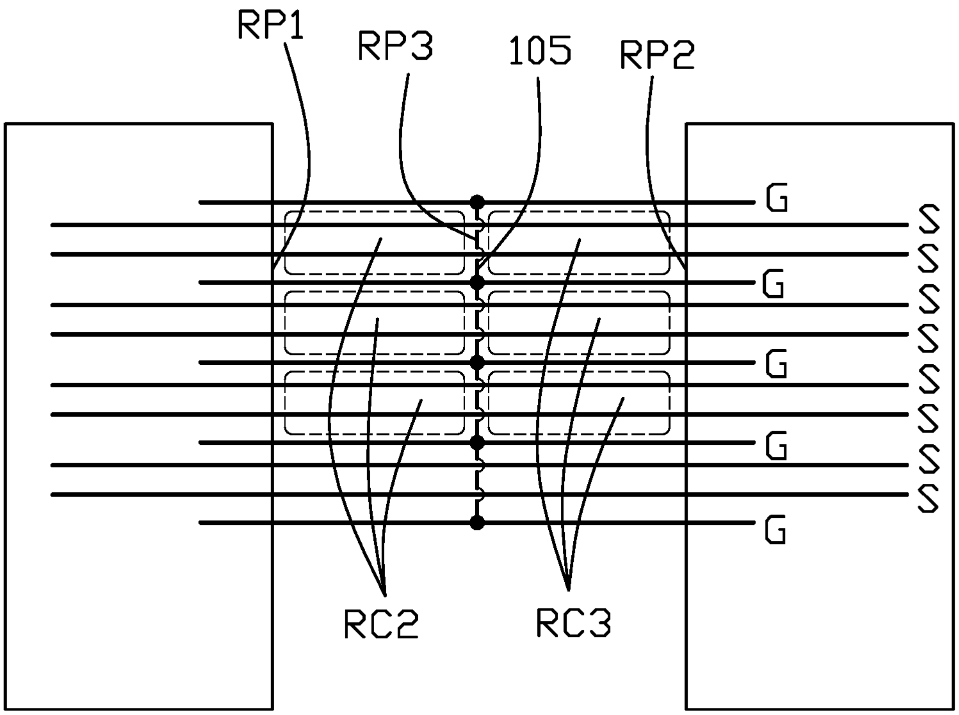
FIG. 2 is a sketch figure of EM wave reflecting points and resonance cavities among transmission path with a common grounding bar.

Referring to FIG. 2, a unitary grounding bar 105 is added for connecting with all the grounding paths G, which is named as a common grounding bar 105. It is noted that the common grounding bar 105 goes across but does not contact with the pairs of differential signal terminals. The common grounding bar 105 provides another reflect points RP3 and resonance cavities is formed between two zero impedance ground terminations. As shown, there are one resonance cavities RC2 between the reflect point RP1 at the PCB ground plane 101 and the reflect point RP3, and one resonance cavity RC3 between the reflect point RP3 and the reflect point RP2 at the cable ground shielding 102, at each side of the grounding path. It is noted that only the resonance cavities at two grounding path G are illustrated. The resonance cavities RC2, RC3 are shorter than the resonance cavities RC1 in FIG. 1, which push grounding resonance shift rightwards/a higher frequency. The common grounding bar 105 is widely used in convention connectors. But as known, the resonance cavities RC2, RC3 still cause as a series of periodical peaks in S-parameters.

Figure 3:
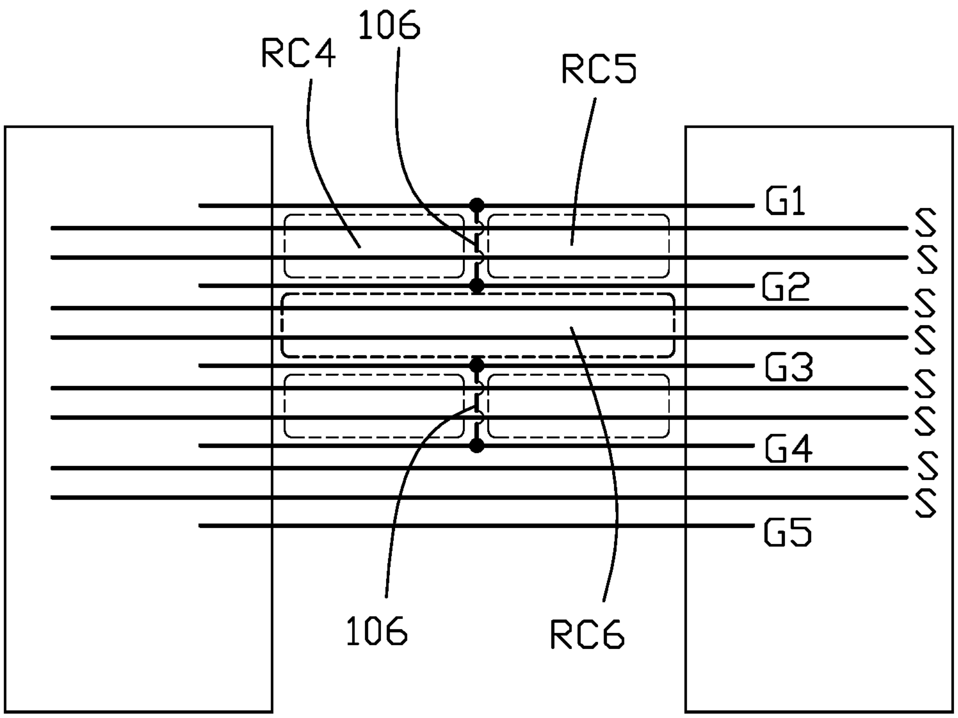
FIG. 3 is a sketch figure of EM wave reflecting points and resonance cavities among transmission path with single grounding bars.

Referring to FIG. 3, several single grounding bar 106 are adapted for connecting two grounding path G1, G2 at two opposite sides of the differential pair. It is noted that there is no grounding bar provided for connecting with the two grounding path G2, G3 at two outsides of another differential pair adjacent to said differential pair. As clear shown, there are two short resonance cavities RC4, RC5 at one side of the ground path G2, one long resonance cavity RC6 at another side of the grounding path G2. It is clear that the resonance cavity RC4, RC5 is different from the resonance cavity RC6, the reflection coefficient of the grounding termination varies and the alternate reflections destroy the resonance condition. Therefore, the grounding resonance is suppressed. In S-parameters, the periodical peaks are suppressed.

Figure 4:
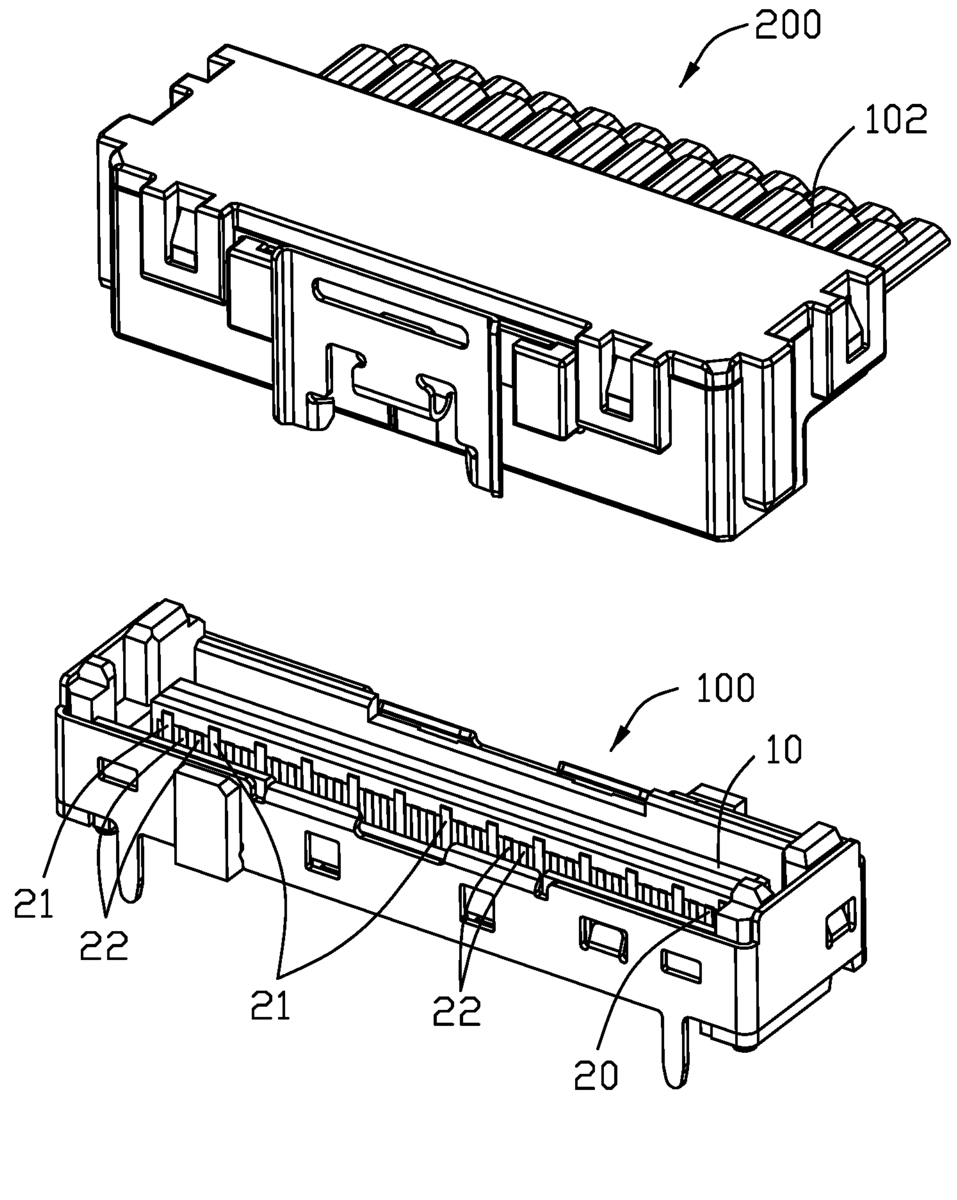
FIG. 4 is a perspective view of an electrical connector assembly of a first embodiment in accordance with the present invention, including a board connector and a cable connector disconnecting from each other.
Figure 5:
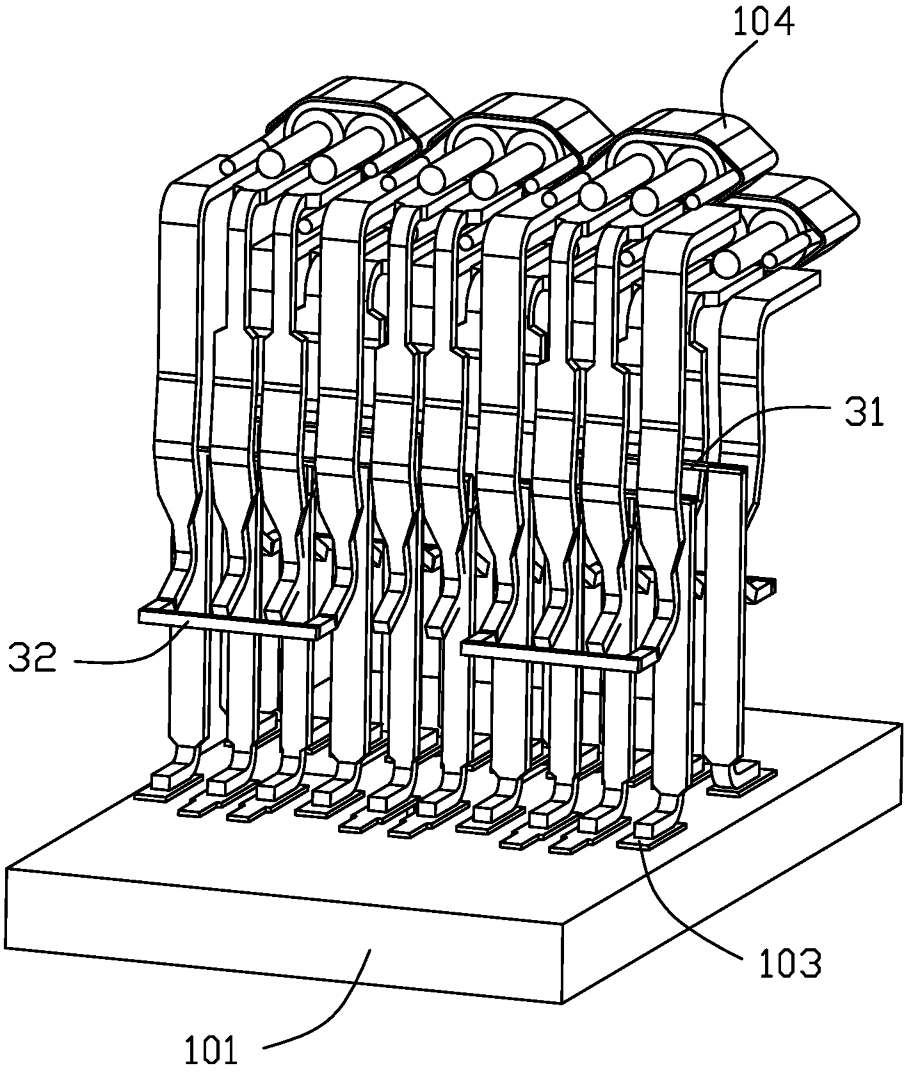
FIG. 5 is a partially perspective view of the electrical connector assembly in FIG. 4, with an insulating housing and a metal shell taken away and the board connector being mounted on a printed circuit board.
Figure 6:
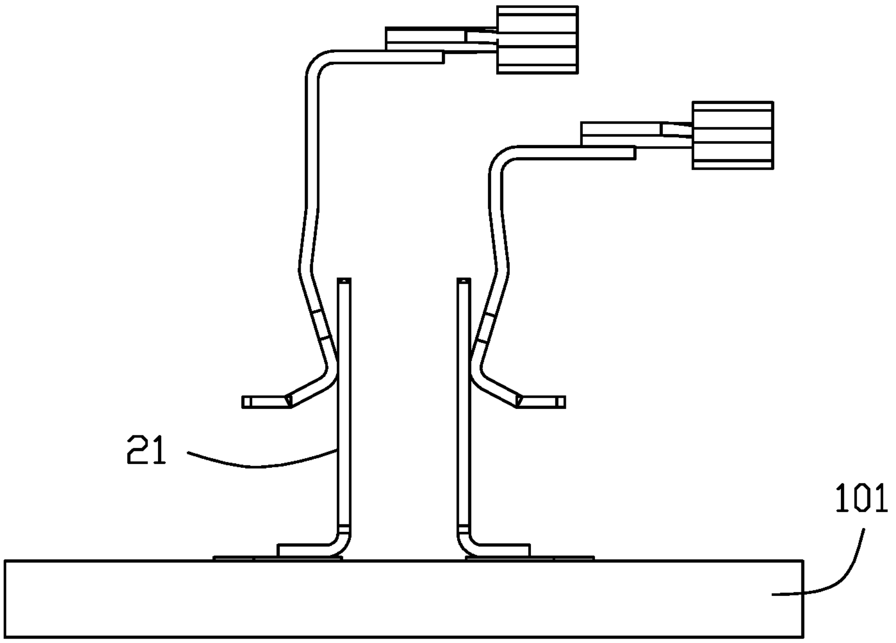
FIG. 6 is a side view of the electrical connector assembly in FIG. 4.

FIGS. 4-6 illustrate a first embodiment of this invention, in which the single grounding bars are used in a lower profile electrical connector assembly. The electrical connector assembly includes a board connector 100 and a cable connector 200. The board connector 100 includes an insulating housing 10 and two rows of terminals 20. Each row of terminals 20 includes a plurality of grounding terminals 21 and one pair of differential signal terminals 22 between every adjacent grounding terminals 21. In the shown board connector 100, thirteen grounding terminals and twelve pairs of differential signal terminals.

FIGS. 5-6 show an engagement of the board connector 100 mounted on a printed circuit board 101 and the cable connector 200, in which a half of the connector assembly are cut away and the insulating housing and metallic shells of the assembly 1000 are taken away. It is noted that the printed circuit board 101 provides the PCB ground plane 103 and the cable connector 102 provides the cable ground shielding 104. Single grounding bars 31, 32 are added both in the board connector 100 and the cable connector 200, which will be described hereinafter.

Figure 7:
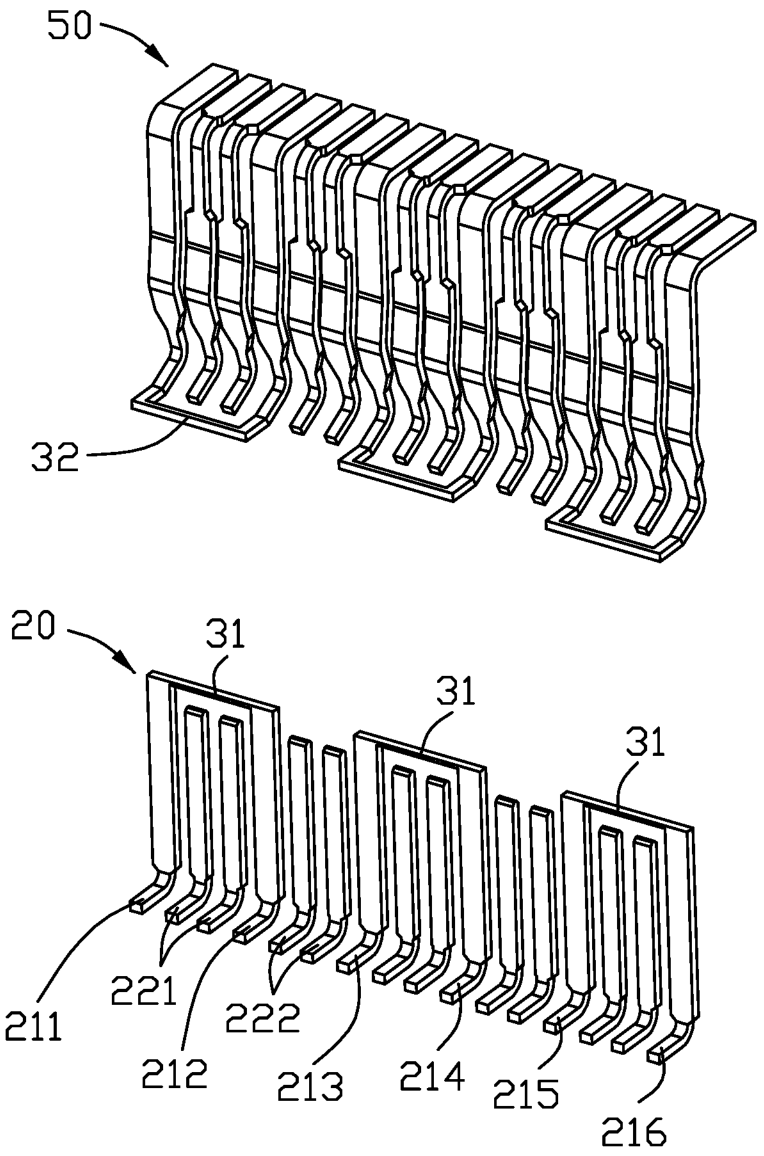
FIG. 7 is a perspective view of some of one row of the terminals of the board connector and some of one row of the terminals of the cable connector.

FIG. 7 shows three single grounding bars 31 connecting with corresponding two grounding terminals 22, but not limited. Every two adjacent grounding terminals 22 are bridged with one single grounding bar 31 and constructed as a coupling grounding pair. In this embodiment, the grounding terminals 211, 212 connected with the single grounding bar 31 are constructed as a coupling grounding pair. Similar, the grounding terminals 213, 214 are constructed as another coupling grounding pair, the grounding terminals 215, 216 are constructed as another coupling grounding pair. The single grounding bars 30 are interval and across the corresponding pair of differential signal terminals. That is, every two adjacent grounding terminals are constructed as one coupling grounding pair. But, every two adjacent couple grounding pair are separated from each other with no single grounding bar 31 connecting with each other. It is noted that in this engagement pattern of board-to-cable connectors, the grounding bars are close to mating ends of the two connectors, i.e., near to a middle point of the signal and grounding path, a shortest path is achieved. Alternatively, the grounding bars can be disposed at other points along an extending direction of the terminal.

In a selected G-S-S-G-S-S-G terminal group, the three grounding terminals includes a middle grounding terminal 212 between every two pair of differential signal terminals 221, 222, and a first side grounding terminal 211 and a second terminal 213 at two opposite sides of the middle grounding terminal 212. Because of the adding of single grounding bar 30, electromagnetic waves reflecting points between the middle grounding terminal 212 and the first side grounding terminal 211 are asymmetrical from electromagnetic waves reflecting points between the middle grounding terminal 212 and the second side grounding terminal 213, thereby destroying a resonance condition of the grounding terminals 212 and suppress corresponding ground resonance. Similarly, in any other selected G-S-S-G-S-S-G terminal group, the middle grounding terminal between two adjacent pairs of differential terminals, reflections at opposite sides of the middle grounding terminals are different from each other, so as to destroying a resonance condition of the grounding terminals and suppress corresponding ground resonance. In general, the single grounding bars have a same material of the terminals, like metal. A lateral gap between the grounding bar and corresponding signal terminal is equal or larger than a lateral gap between ground terminal and signal terminal. A width and thickness of single grounding bars are as same as that of grounding terminals.

In this embodiment of FIG. 7, the grounding terminals 21 have front ends projecting than the differential terminals 22, and the single grounding bar 31 unitarily connects with the front ends of the grounding terminals 21. The single grounding bar 31 make the front end of the terminals to a Closed-Open-Closed pattern in order to suppress the ground resonance, which make the electrical connector transmit signal up to 25 GHz. Alternatively, the single grounding bars connects with grounding terminals at other points thereof, and the grounding bars can attached to the grounding terminals by welding. The upper part of FIG. 7 shows the terminals of the cable connector 200 with single grounding bars 32, which has a same arrangement to the terminals 20 of the board connector. This type of single bars design is effective when the connector mating junction (the contact points of board and cable connector) is located at around the middle the whole connector length.

Figure 13:
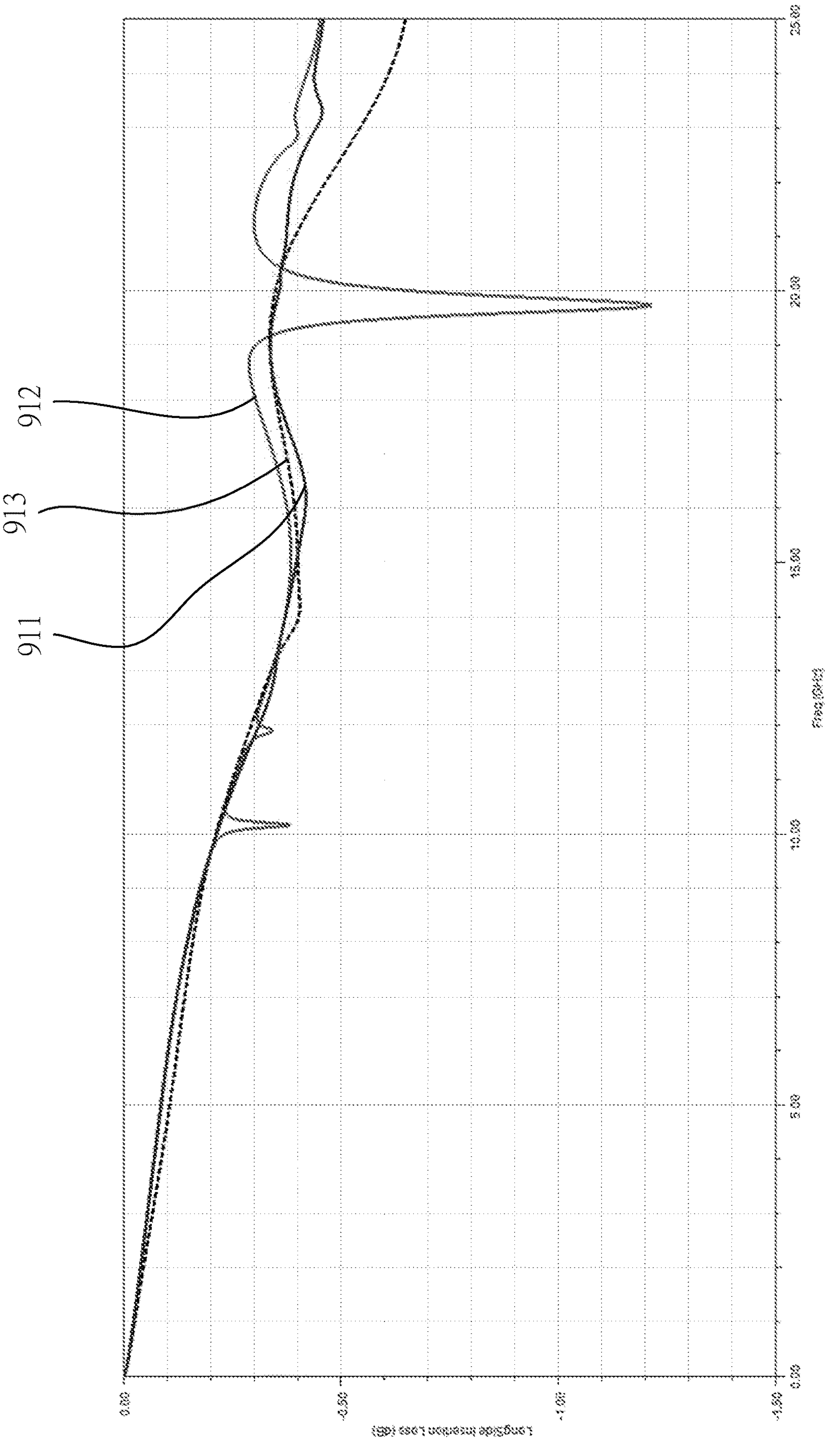
FIG. 13 is an insertion loss graph shown a comparison that generated by the electrical connector of the first embedment with single grounding bars, the electrical connector with no grounding bar and the electrical connector with conductive lossy polymer as a benchmark.

The grounding resonance peaks are suppressed as shown in FIGS. 13-16 of the first embodiment shown in FIG. 5. FIG. 13 is a comparison of three insertion loss graph. Line 911 shows an insertion loss graph generated by an electrical connector with single grounding bars, lines 912 shows an insertion loss graph generated by an electrical connector with no grounding bar, lines 913 shows an insertion loss graph generated by an electrical connector with conductive lossy polymer as a benchmark. It is clear that line 911 is smooth with no sharp valley.

Figure 14:
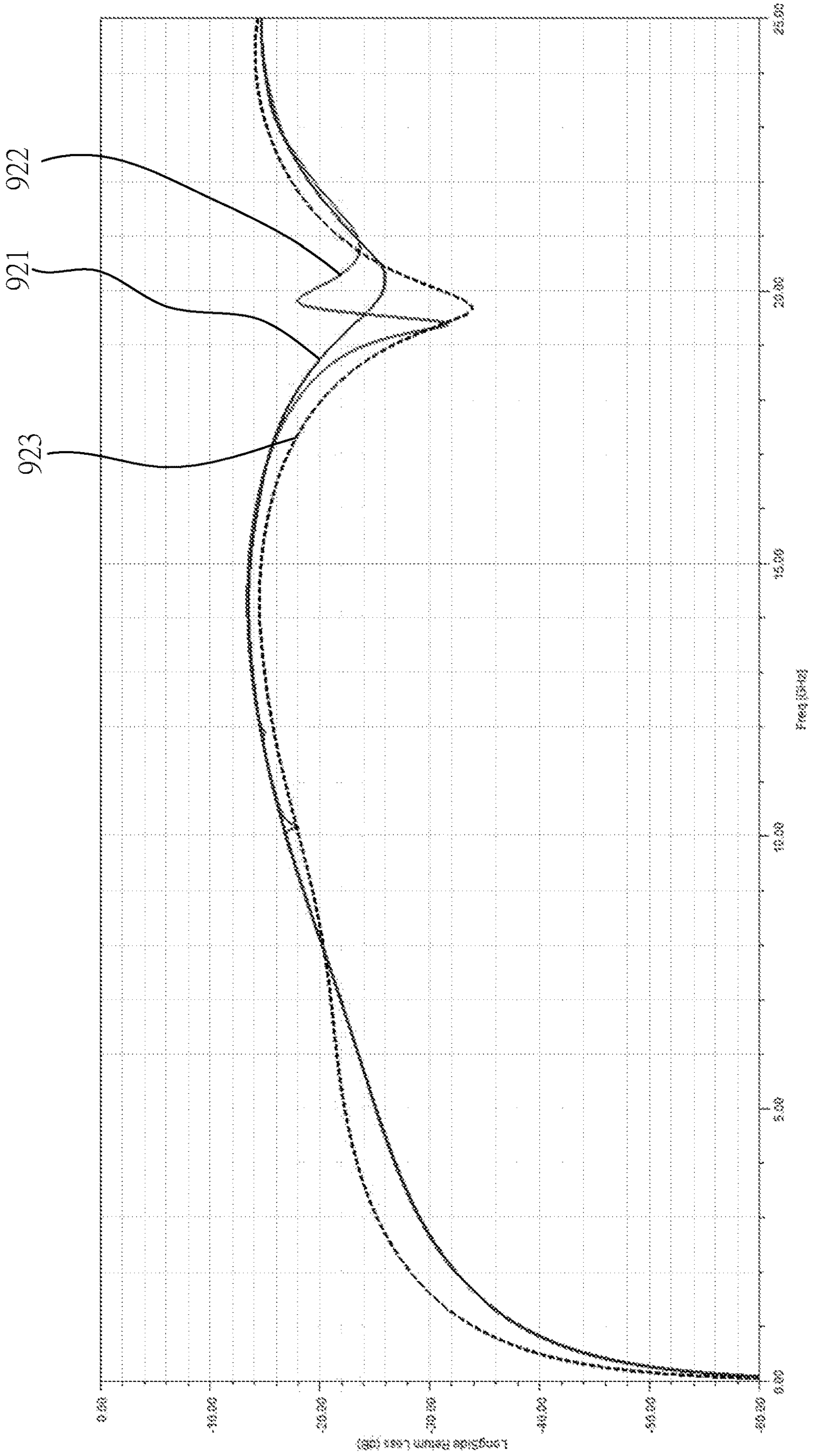
FIG. 14 is a return loss graph shown a comparison that generated by the electrical connector of the first embedment with single grounding bars, that with no grounding bar and that with conductive lossy polymer as a benchmark.
Figure 15:
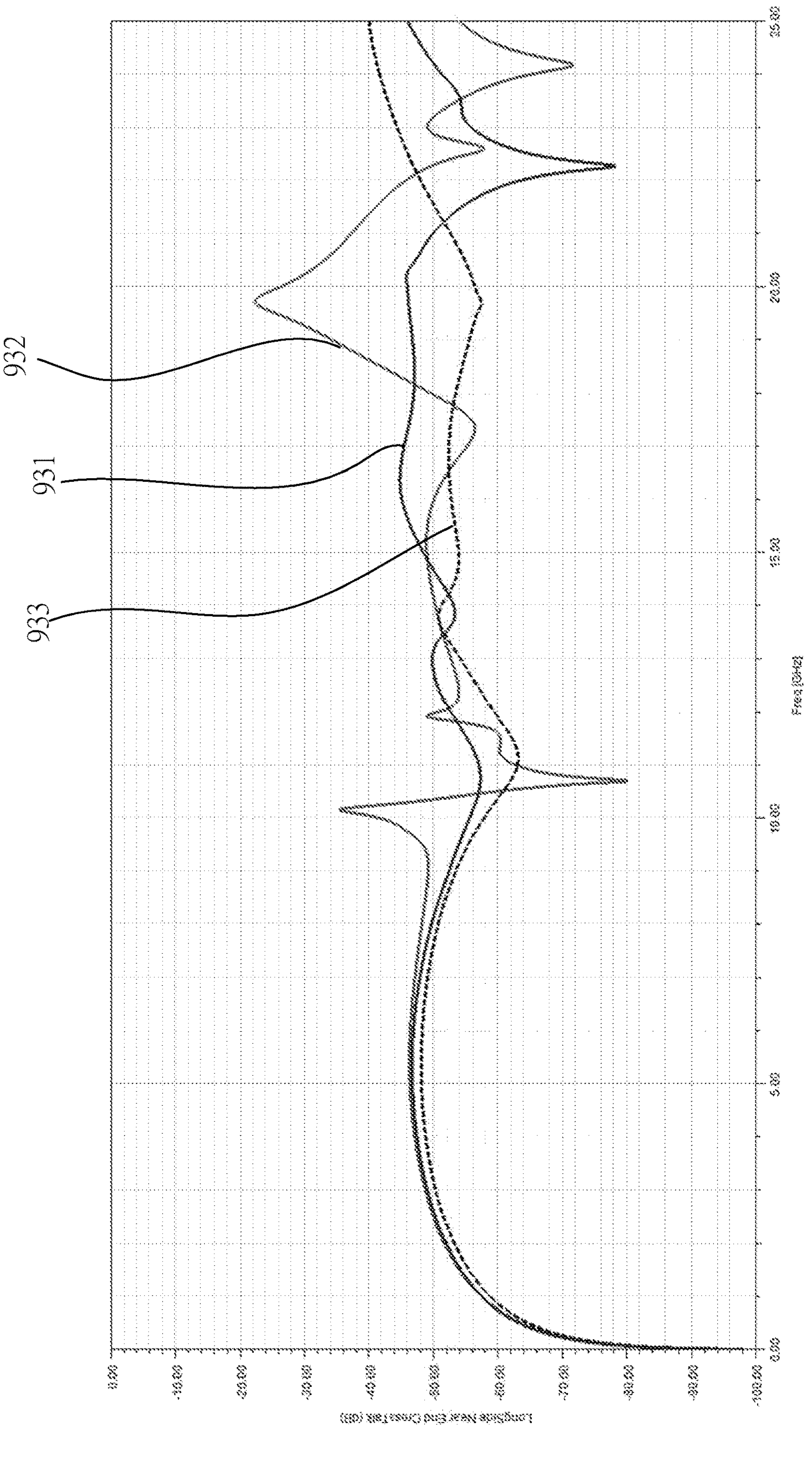
FIG. 15 is a near end crosstalk graph shown a comparison that generated by the electrical connector of the first embedment with single grounding bars, that with no grounding bar and that with conductive lossy polymer as a benchmark.
Figure 16:
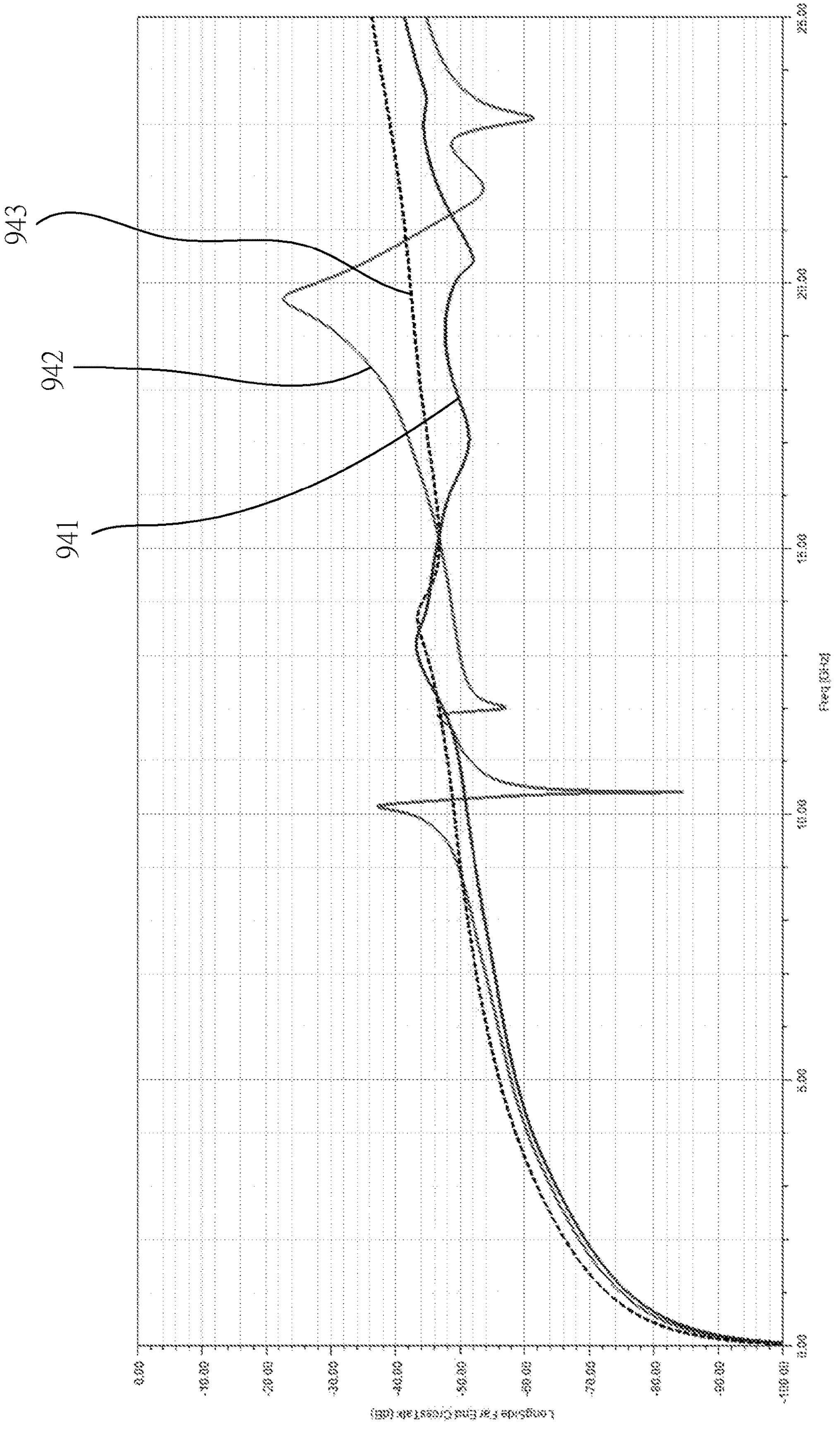
FIG. 16 is a far end crosstalk graph shown a comparison that generated by the electrical connector of the first embedment with single grounding bars, that with no grounding bar and that with conductive lossy polymer as a benchmark.

Similar, FIG. 14 is a comparison of three return loss graphs, FIG. 15 is a comparison of three near end crosstalk graph, FIG. 16 is a comparison of three far end crosstalk graph shown. Lines 921, 931, 941 have no sharp peak. That is, the grounding resonance peaks are suppressed.

Figure 8:
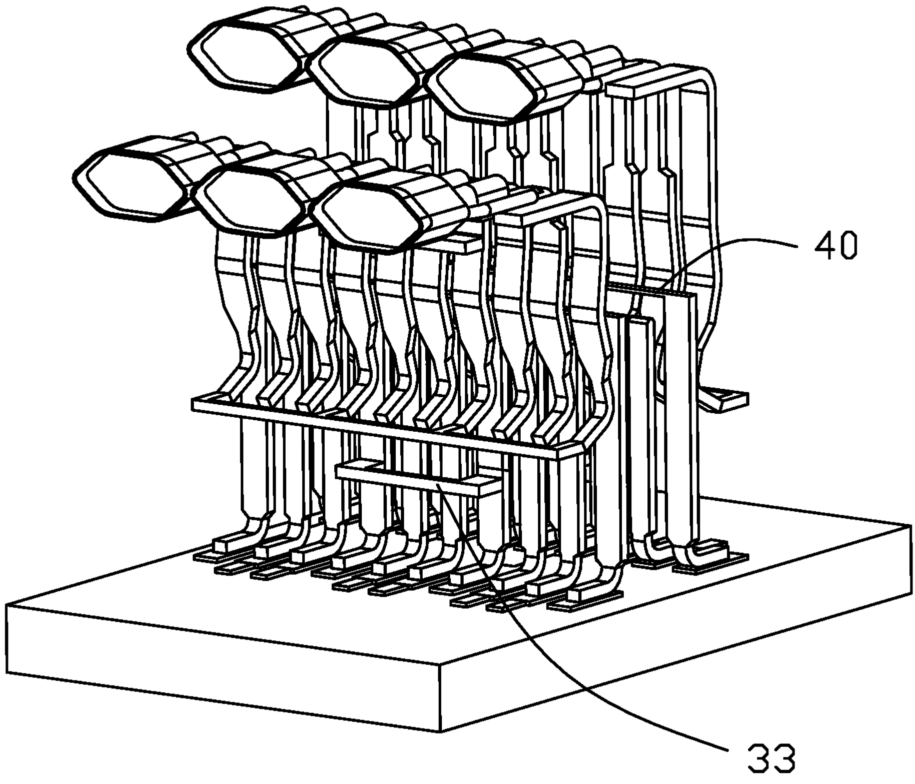
FIG. 8 is similar to FIG. 7, showing an electrical connector assembly of a second embodiment in accordance with the present invention.
Figure 9:
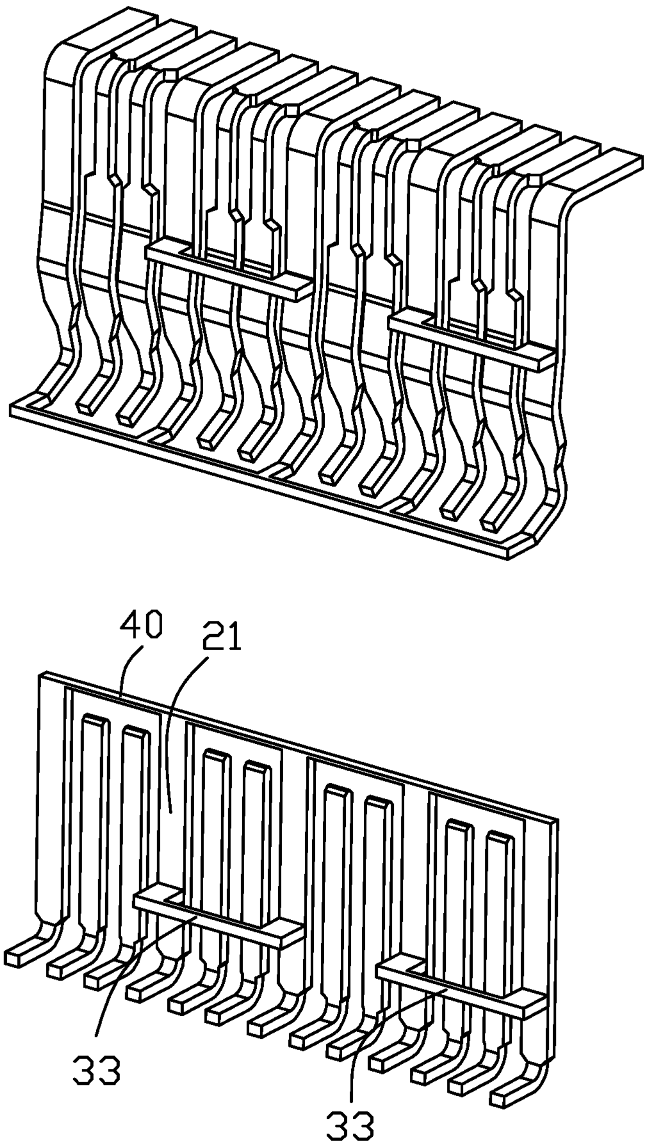
FIG. 9 is similar to FIG. 5, showing an electrical connector assembly of the second embodiment.
Figure 10:
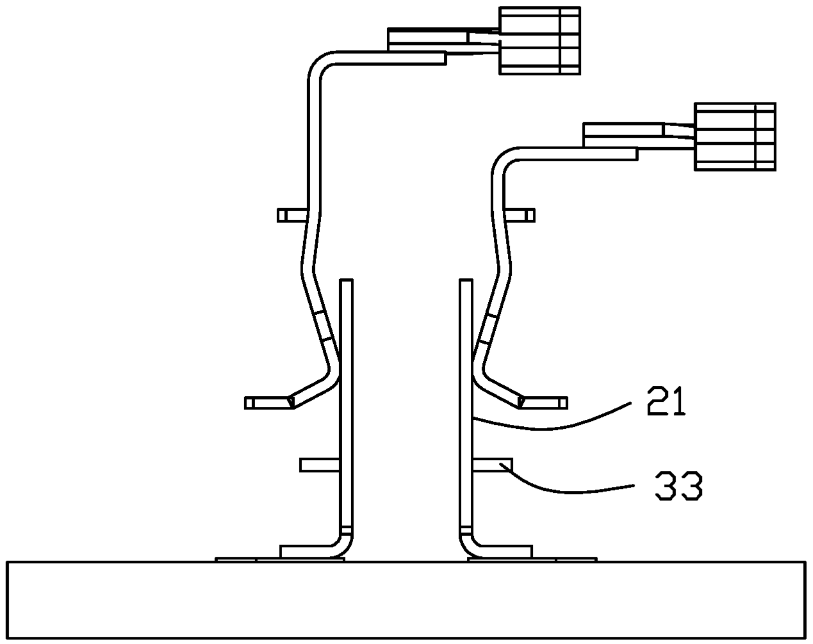
FIG. 10 is similar to FIG. 6, showing the electrical connector assembly of the second embodiment.

FIGS. 8-10 illustrate a second embodiment of this invention. In this embodiment, a single grounding bar 33 bridges two adjacent grounding terminals and a common grounding bar 40 connects with all the grounding terminals of the row of terminals. The common grounding bar 40 joints the front ends of the grounding terminals and the single grounding bar 33 attached with the corresponding grounding terminals at a middle point thereof. Common grounding bars connecting all the grounding terminals are required in order to reduce the crosstalk baseline, when the connector mating junction is located at around the middle the whole connector length.

Figure 17:
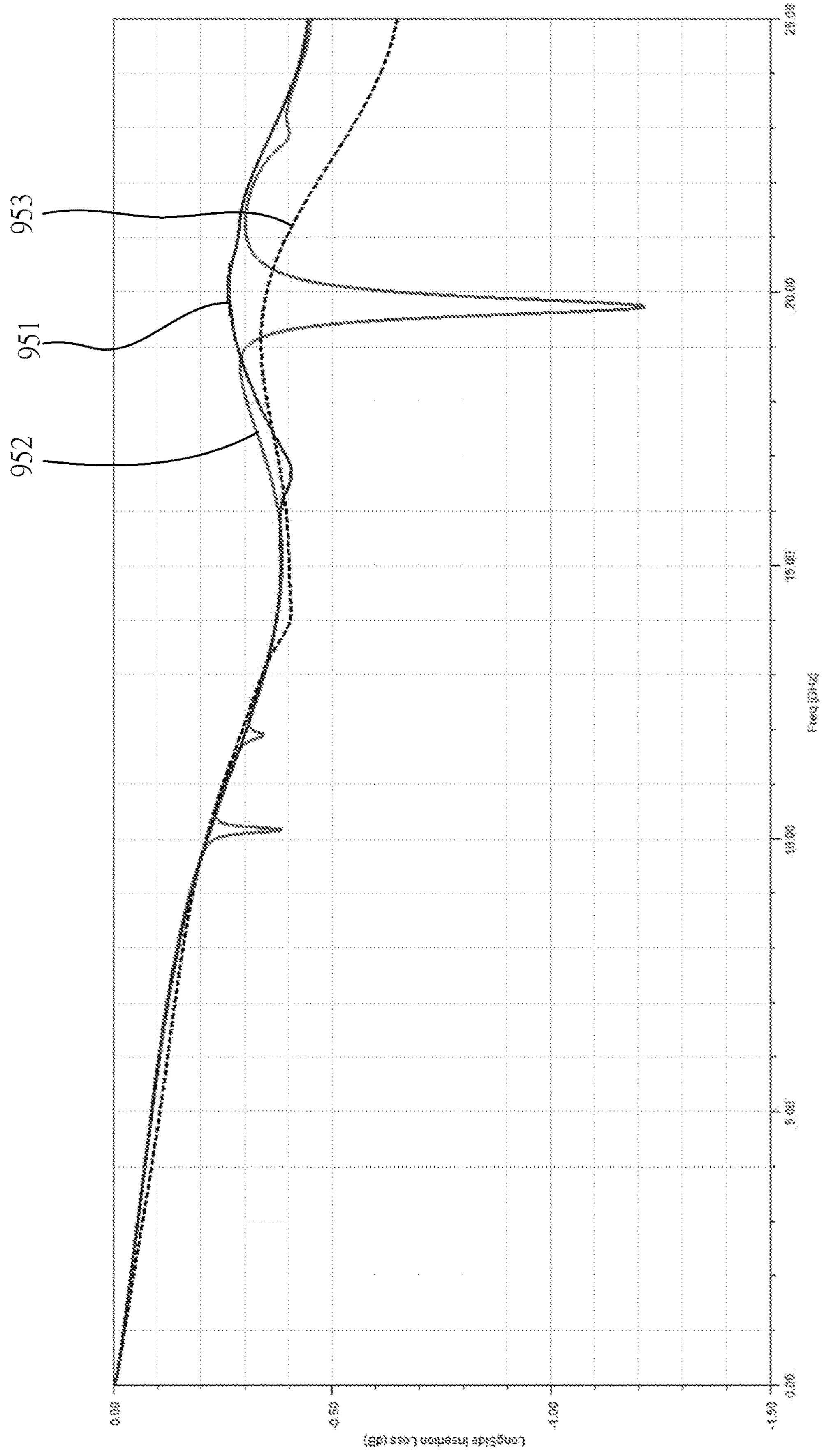
FIG. 17 is an insertion loss graph shown a comparison that generated by the electrical connector of the second embedment with single grounding bars, the electrical connector with no grounding bar and the electrical connector with conductive lossy polymer as a benchmark.
Figure 18:
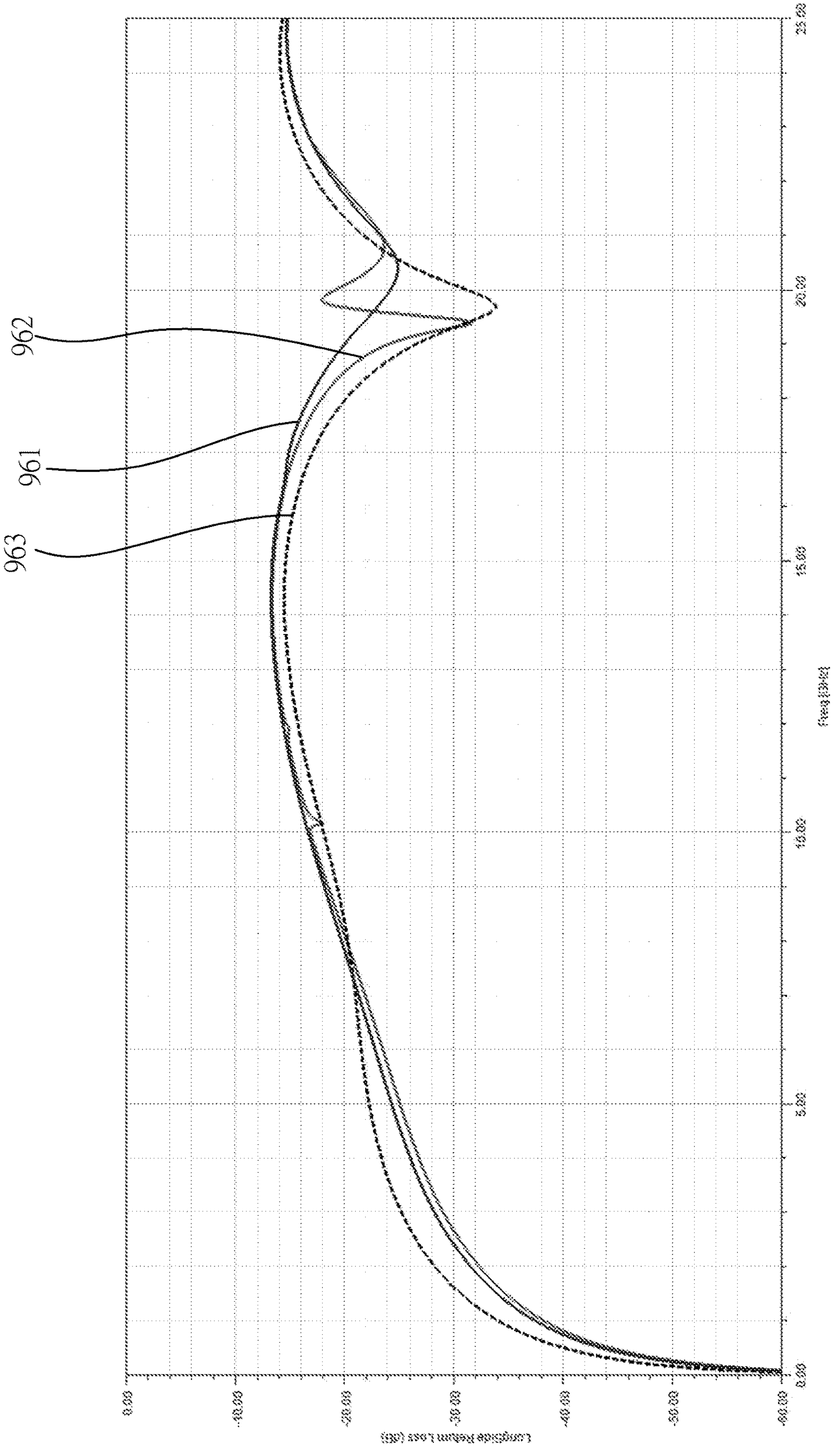
FIG. 18 is a return loss graph shown a comparison that generated by the electrical connector of the second embedment with single grounding bars, that with no grounding bar and that with conductive lossy polymer as a benchmark.
Figure 19:
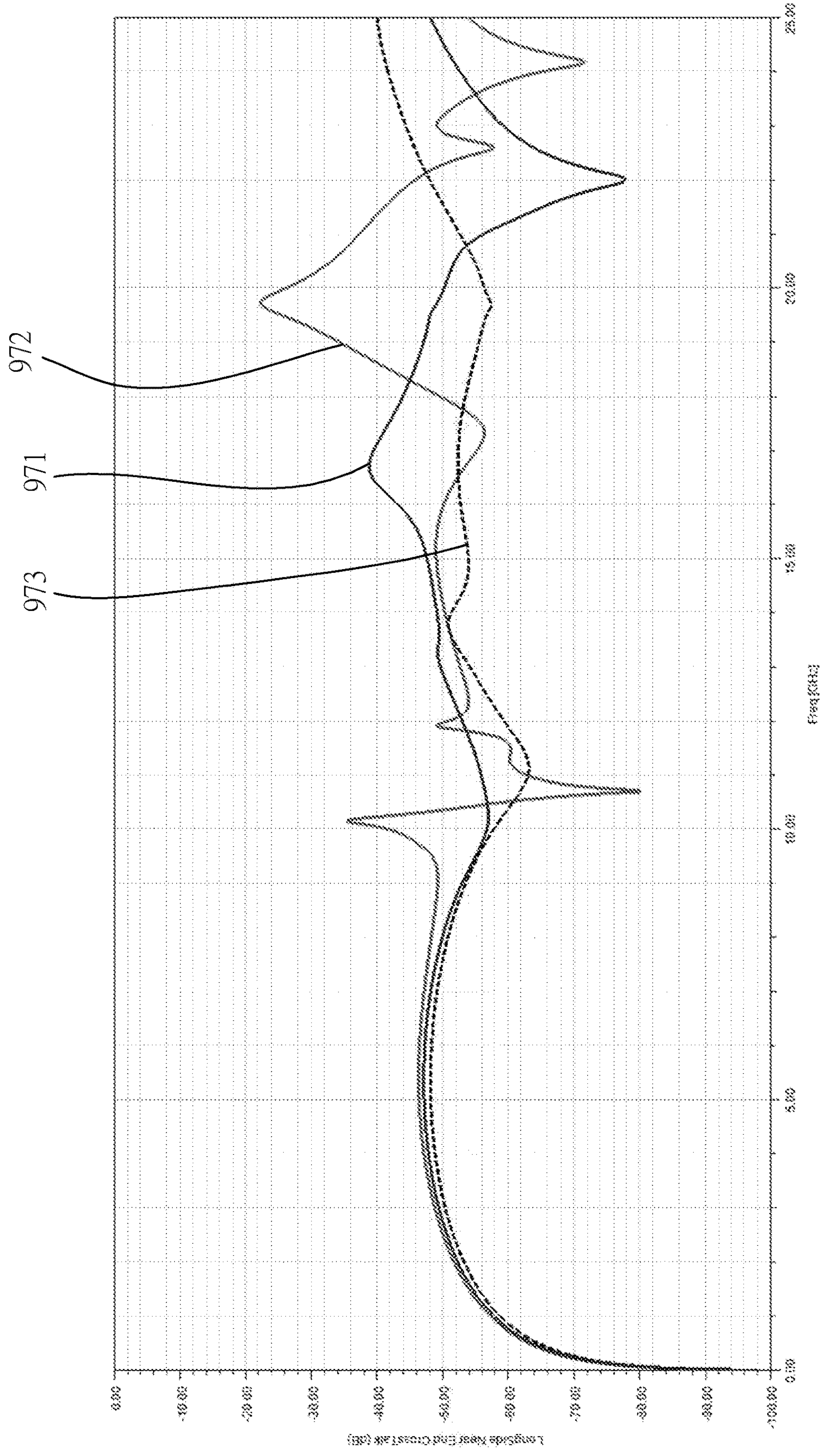
FIG. 19 is a near end crosstalk graph shown a comparison that generated by the electrical connector of the second embedment with single grounding bars, that with no grounding bar and that with conductive lossy polymer as a benchmark.
Figure 20:
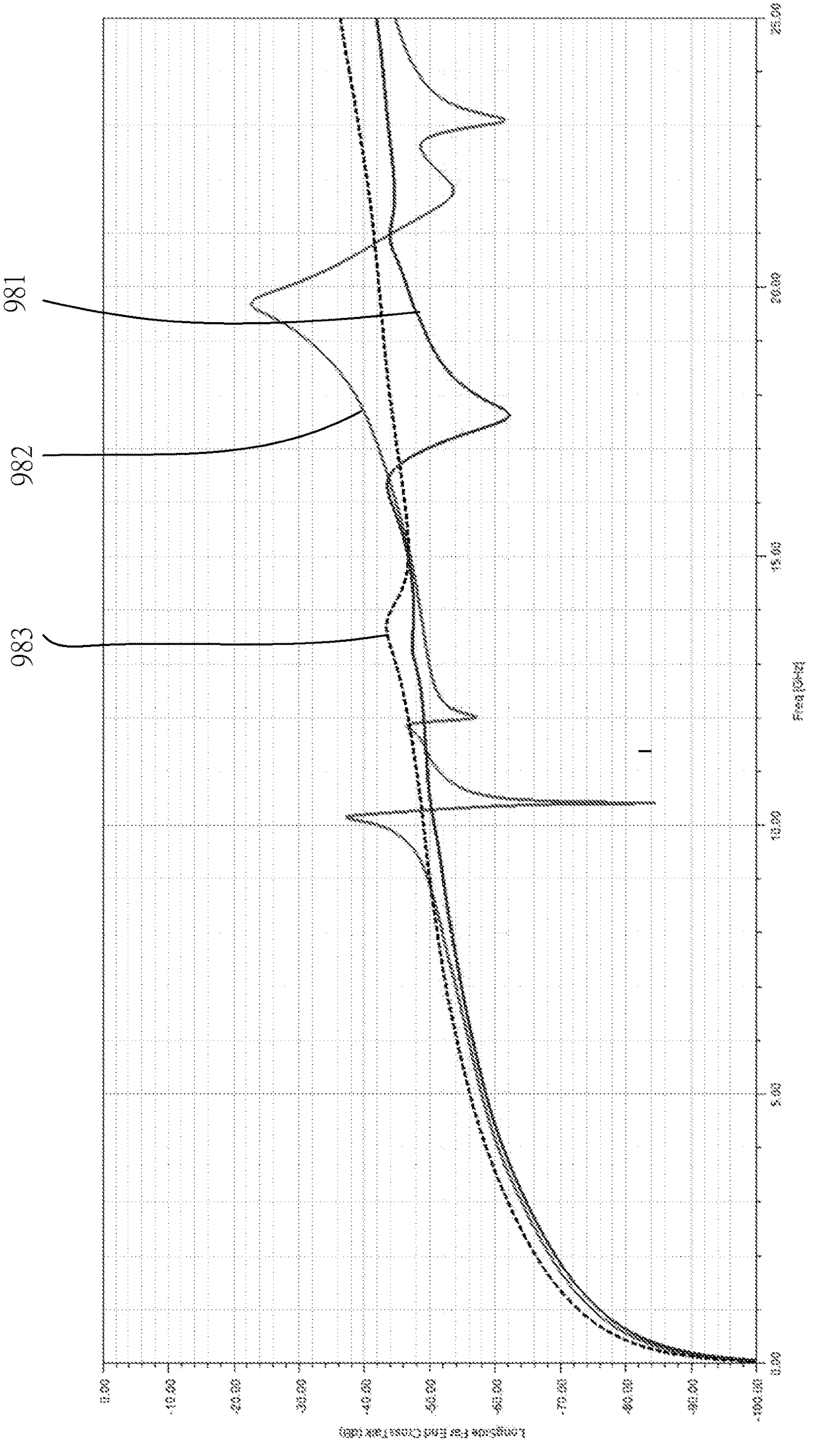
FIG. 20 is a far end crosstalk graph shown a comparison that generated by the electrical connector of the second embodiment with single grounding bars, that with no grounding bar and that with conductive lossy polymer as a benchmark.

The grounding resonance peaks are suppressed as shown in FIGS. 17-20. FIG. 17 is a comparison of three insertion loss graph. Line 951 shows an insertion loss graph generated by an electrical connector of the second embodiment with single grounding bars, lines 952 shows an insertion loss graph generated by the electrical connector with no grounding bar, lines 953 shows an insertion loss graph generated by the electrical connector with conductive lossy polymer as a benchmark. It is clear that line 951 is smooth with no sharp valley insertion loss. Similarly, FIG. 18 is a comparison of three return loss graphs, FIG. 19 is a comparison of three near end crosstalk graph, and FIG. 20 is a comparison of three far end crosstalk graph shown. Lines 961, 971, 981 have no sharp peaks. That is, the grounding resonance peaks are suppressed.

Figure 11:
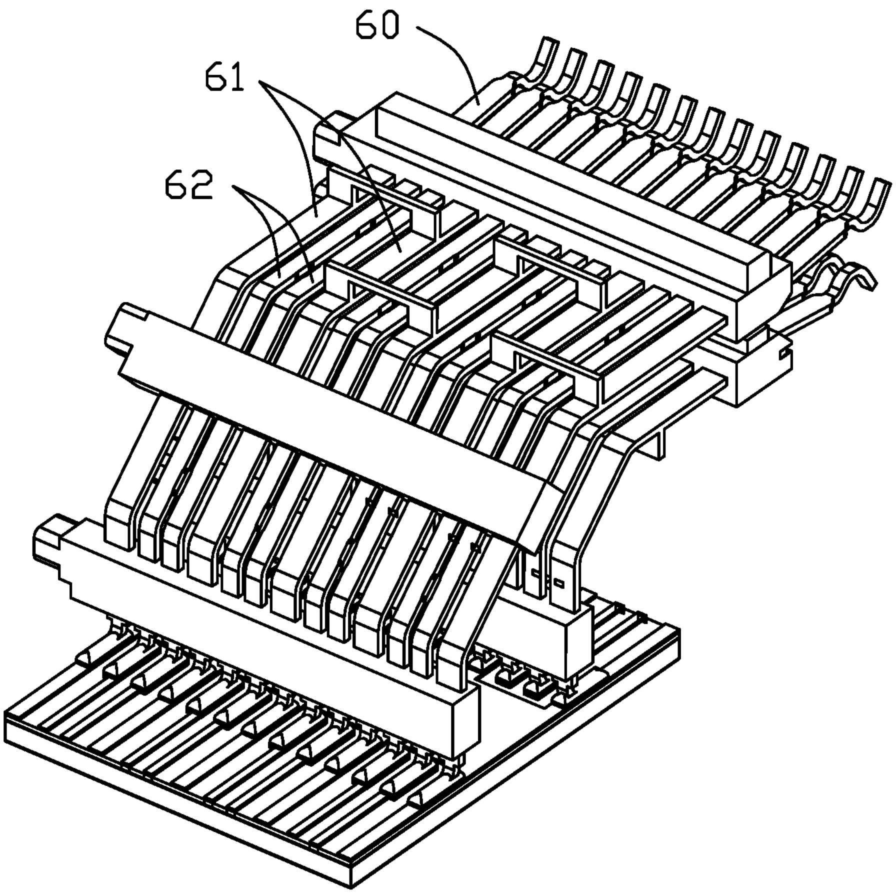
FIG. 11 is a perspective view of an electrical connector of a third embodiment in accordance with the present invention, which is mounted on a printed circuit board and an insulating housing and other elements are taken away.
Figure 12:
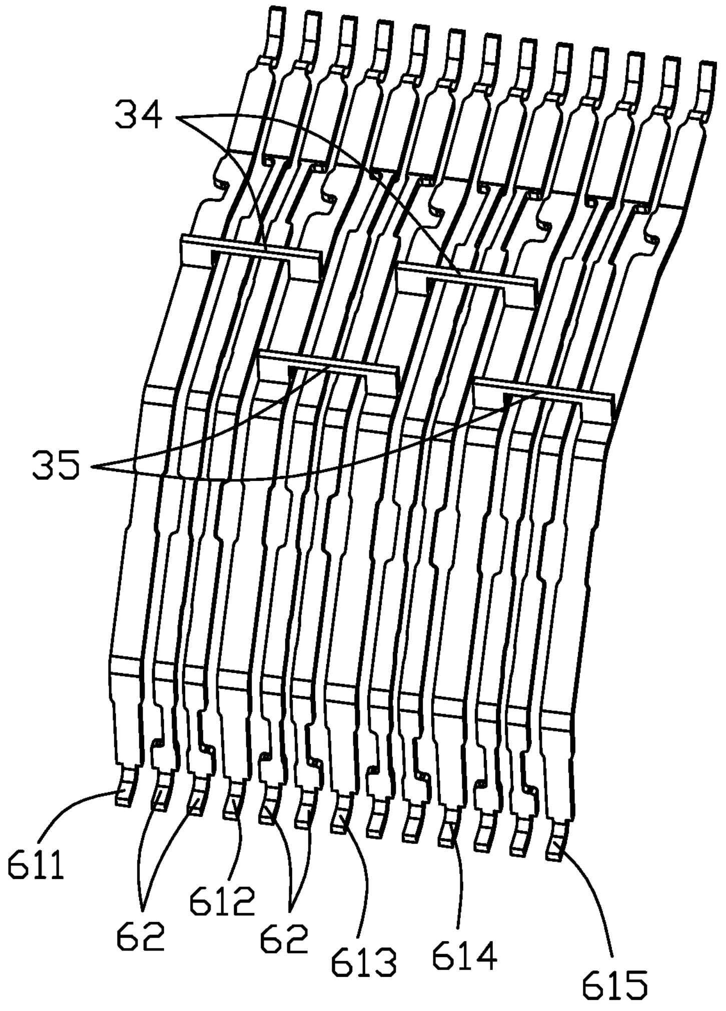
FIG. 12 is a perspective view of an upper row of terminals of the electrical connector in FIG. 11.

FIGS. 11-12 illustrate a third embodiment of this invention. In this embodiment, the single grounding bars 34, 35 are used in an OSFP board electrical connector, which is inserted with a paddle card of a plug connector. The electrical connector includes an upper row and a lower row of terminals 60, each row of terminals includes a plurality of grounding terminals 61 and one pair of differential signal terminals 62 between every two adjacent grounding terminals 61. Two types of single grounding bars 34, 35 are attached near to a middle point of the grounding terminals 61. Two adjacent grounding terminals 611, 612 are bridged with a first single grounding bar 34 and constructed as a coupling grounding pair, next two adjacent grounding terminals 613, 614 are bridged with another first single grounding bar 34 and constructed as another coupling grounding pair. Understandably, every two adjacent grounding terminals are bridged with a first single grounding bar 34 and constructed as a coupling grounding pair. Further, the grounding terminals 612 and 613 are bridge with a second single grounding bar 35, the grounding terminals 614 and 615 are bridge with another second single grounding bar 35. Understandably, the two adjacent grounding terminals of every two adjacent couple grounding pair are bridge with one second single grounding bar 35. The first single grounding bars 34 and the second single grounding bar 35 are located at different points along an extending direction of the grounding terminals. In this embodiment, the first grounding bar 34 are aligned in a lateral direction, and the second grounding bar 35 are aligned in the lateral direction, and the first grounding bars are located near to front ends of the terminals and the second single grounding bar 35 are behind the first grounding bars 34. The OSFP connectors have relative longer terminals, the two types of grounding bars further improve the problem of grounding resonance. It is noted that the common grounding bars are not necessary to reduce crosstalk baseline, when the connector mating junction is located at around the terminal of the whole connector length.

Figure 21:
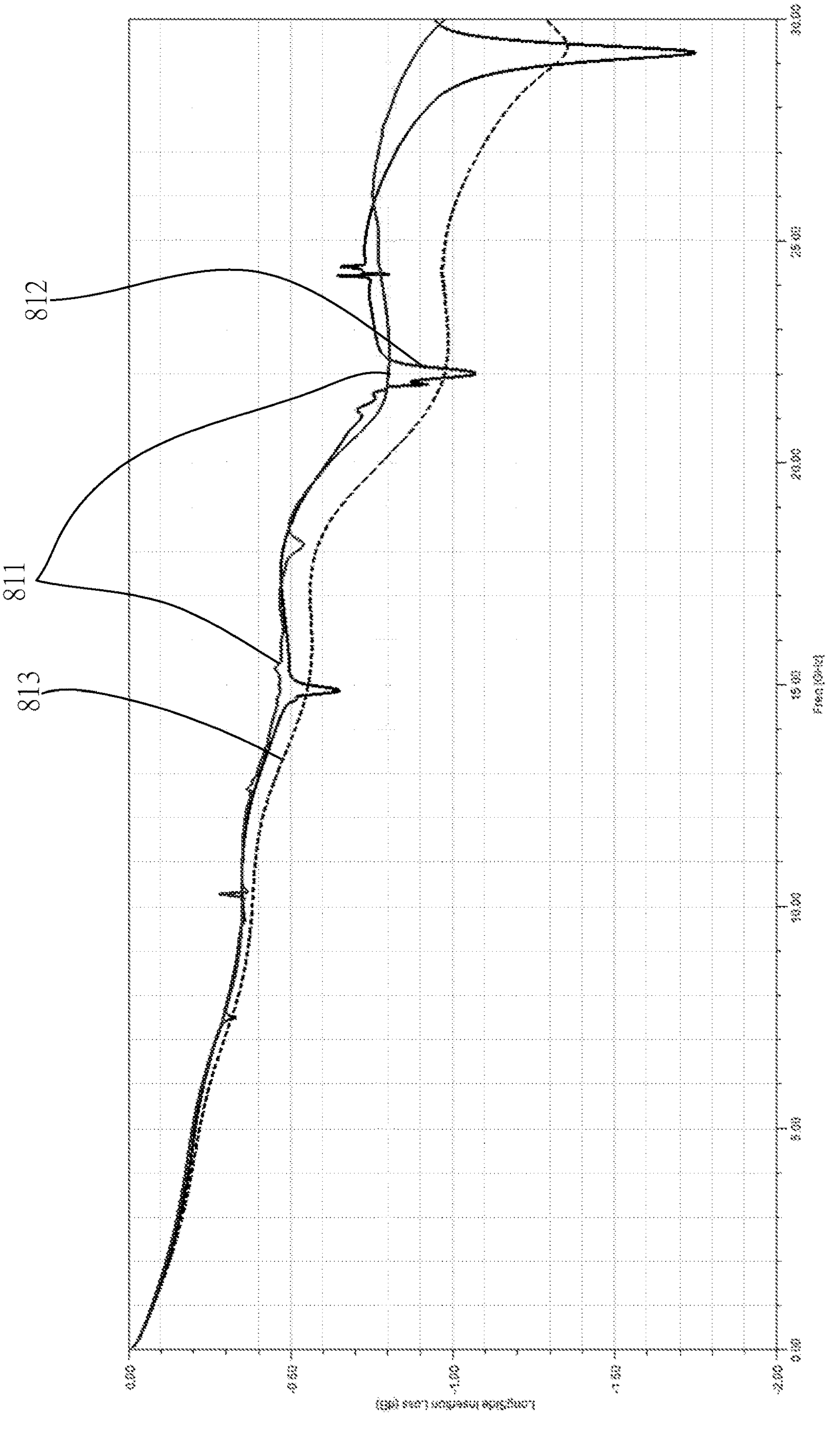
FIG. 21 is an insertion loss graph shown a comparison that generated by the electrical connector of the third embedment with single grounding bars, the electrical connector with no grounding bar and the electrical connector with conductive lossy polymer as a benchmark.
Figure 22:
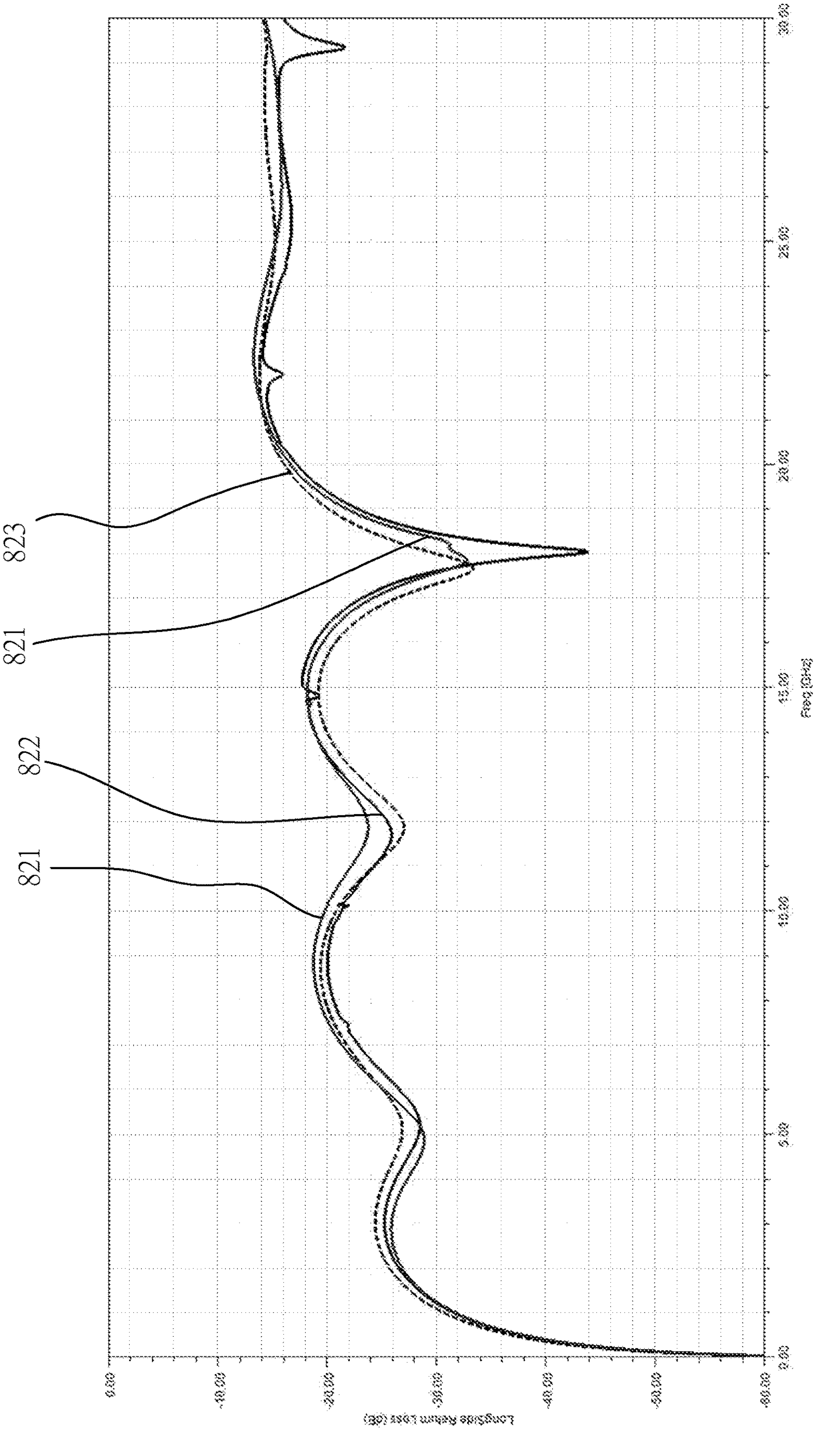
FIG. 22 is a return loss graph shown a comparison that generated by the electrical connector of the third embedment with single grounding bars, that with no grounding bar and that with conductive lossy polymer as a benchmark.
Figure 23:
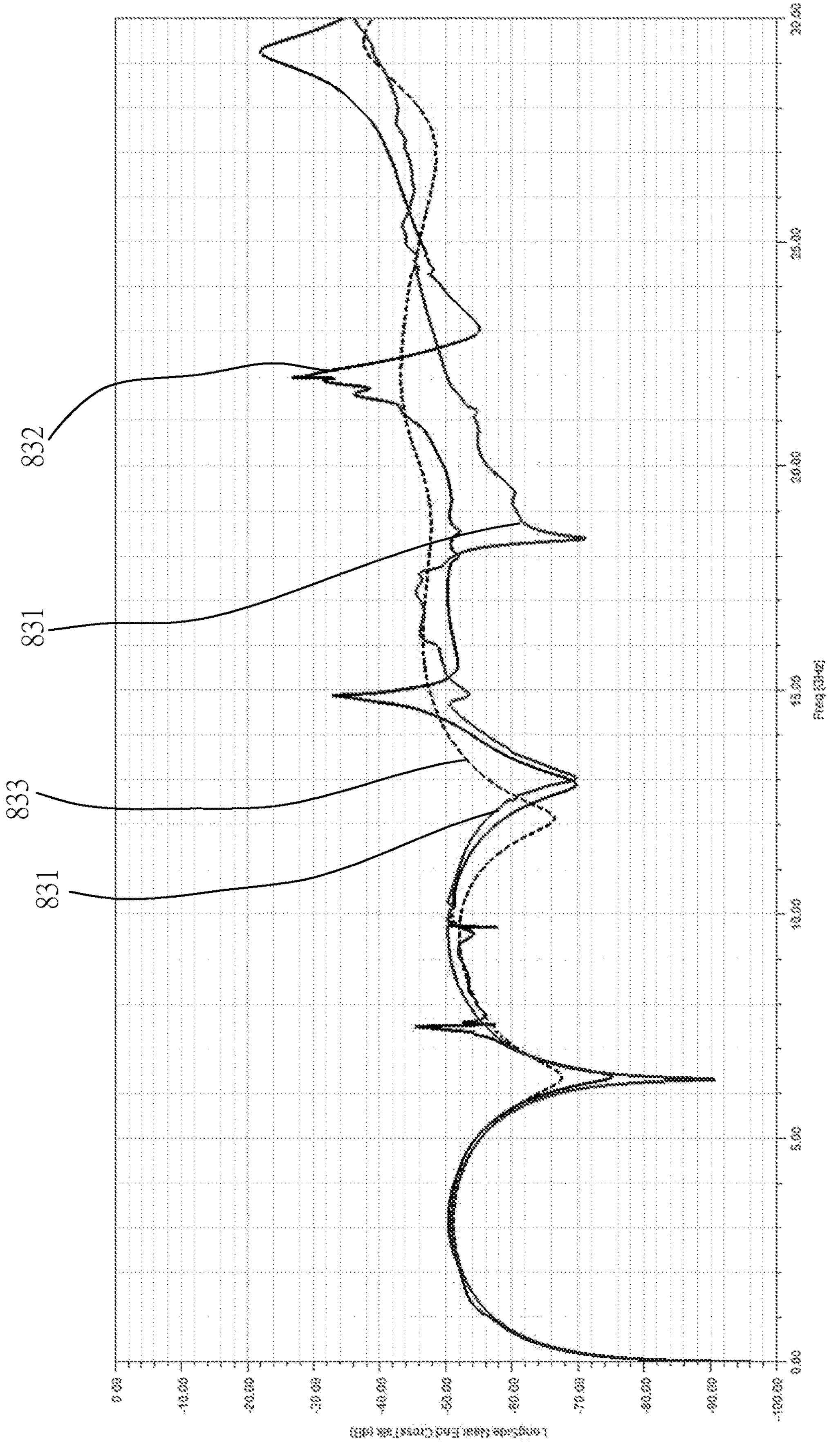
FIG. 23 is a near end crosstalk graph shown a comparison that generated by the electrical connector of the third embedment with single grounding bars, that with no grounding bar and that with conductive lossy polymer as a benchmark.
Figure 24:
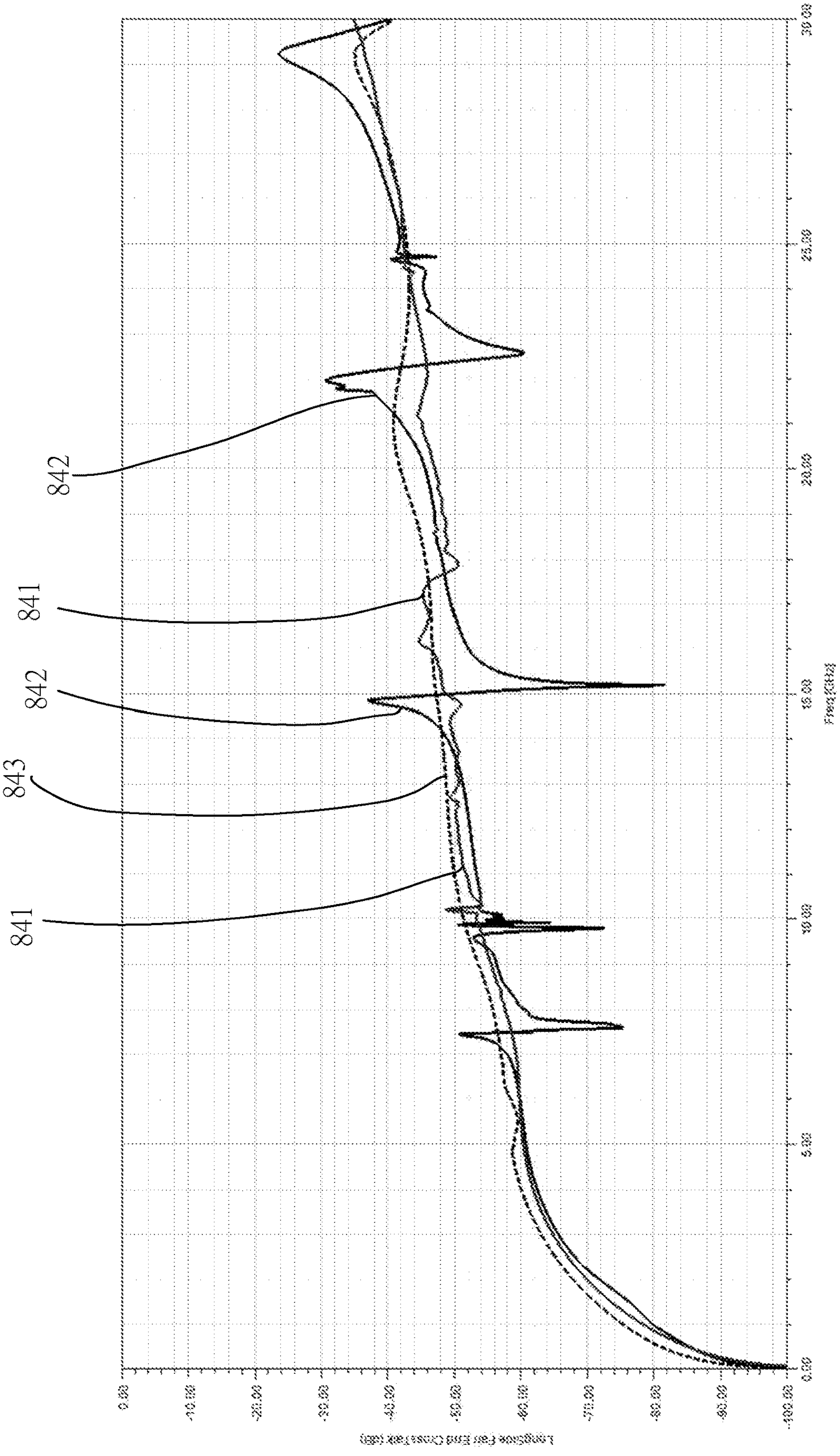
FIG. 24 is a far end crosstalk graph shown a comparison that generated by the electrical connector of the third embodiment with single grounding bars, that with no grounding bar and that with conductive lossy polymer as a benchmark.

The grounding resonance peaks are suppressed as shown in FIGS. 21-24. FIG. 21 is a comparison of three insertion loss graph. Line 811 shows an insertion loss graph generated by an electrical connector of the third embodiment with single grounding bars, lines 812 shows an insertion loss graph generated by the electrical connector with no grounding bar, lines 813 shows an insertion loss graph generated by the electrical connector with conductive lossy polymer as a benchmark. It is clear that line 821 is smooth with no sharp valley insertion loss. Similarly, FIG. 22 is a comparison of three return loss graphs, FIG. 23 is a comparison of three near end crosstalk graph, and FIG. 24 is a comparison of three far end crosstalk graph shown. Lines 811, 821, 831 have no sharp peaks. That is, the grounding resonance peaks are suppressed.

However, the disclosure is illustrative only, changes may be made in detail, especially in matter of shape, size, and arrangement of parts within the principles of the invention.

The invention claimed is:

1. An electrical connector comprising:

an insulative housing loaded with a row of terminals arranged along a lateral direction; and the row of terminals comprising a plurality of grounding terminals and a respective pair of differential signal terminals between every two adjacent grounding terminals along the lateral direction, the plurality of grounding terminals comprising a middle grounding terminal between two pairs of differential signal terminals and a first side grounding terminal and a second side grounding terminal at two opposite sides of a corresponding middle grounding terminal;

wherein electromagnetic waves reflecting points between the middle grounding terminal and the first side grounding terminal are asymmetrical from electromagnetic waves reflecting points between the middle grounding terminal and the second side grounding terminal to destroy a resonance condition of the grounding terminals and suppress corresponding ground resonance; and wherein the middle grounding terminal and the first side grounding terminal are bridged with a first single grounding bar, the middle grounding terminal and the second side grounding terminal are bridged with a second single grounding bar, and the first and the second single grounding bars are offset in the lateral direction.

2. The electrical connector as claimed in claim 1, wherein the middle grounding terminal and the first side grounding terminal are bridged with a single grounding bar while the middle grounding terminal and the second side grounding terminal are separated from each other with no grounding bar.

3. The electrical connector as claimed in claim 1, further comprising a common grounding bar connecting with all the grounding terminals.

4. An electrical connector comprising:

an insulative housing loaded with a row of terminals arranged along a lateral direction; and the row of terminals at least comprising a plurality of grounding terminals and a respective pair of differential signal terminals between every two adjacent grounding terminals; and a common grounding bar connecting with all the grounding terminals;

wherein selected two adjacent grounding terminals are bridged with a single grounding bar and constructed as a coupling grounding pair, while every adjacent coupling grounding pairs are separated from each other.

5. The electrical connector as claimed in claim 4, wherein the common grounding bar is unitary with respective front ends of the grounding terminals, and the single grounding bars are attach with corresponding grounding terminals.

6. The electrical connector as claimed in claim 4, wherein the single grounding bars are unitarily connected with respective front ends of the grounding terminals, and no common grounding bar is provided to connect with the grounding terminals.

7. An electrical connector comprising:

an insulative housing loaded with a row of terminals arranged along a lateral direction; and the row of terminals comprising a plurality of grounding terminals and a respective pair of differential signal terminals between every two adjacent grounding terminals;

wherein selected two adjacent grounding terminals are bridged with a first single grounding bar and constructed as a coupling grounding pair, while two adjacent grounding terminals of every two adjacent coupling grounding pairs are bridged with a second single grounding bar but not any other grounding bar, and the first single grounding bar is located closer to front ends of the grounding terminals than the second single grounding bar is.

8. The electrical connector as claimed in claim 7, wherein the single first grounding bars are located aligned with each other along the lateral direction, and the second single grounding bars are located aligned with each other along the lateral direction.

* * * * *